United States Patent
Zhu et al.

(10) Patent No.: US 11,678,189 B2
(45) Date of Patent: Jun. 13, 2023

(54) SVM-BASED SECURE ACCESS METHOD FOR WIRELESS TERMINALS

(71) Applicant: State Grid Jiangsu Electric Power Co., Ltd, Jiangsu (CN)

(72) Inventors: Hong Zhu, Nanjing (CN); Wendi Wang, Nanjing (CN); Dongxu Zhou, Nanjing (CN); Lisha Gao, Nanjing (CN); Shaojun Liu, Nanjing (CN); Hao Yu, Nanjing (CN); Honghua Xu, Nanjing (CN); Zhengyi Zhu, Nanjing (CN); Su Pan, Nanjing (CN); Tianyi Li, Nanjing (CN); Yifan Zhu, Nanjing (CN); Linqing Yang, Nanjing (CN)

(73) Assignee: State Grid Jiangsu Electric Power Co., Ltd, Nanjing (CN)

( * ) Notice: Subject to any disclaimer, the term of this patent is extended or adjusted under 35 U.S.C. 154(b) by 69 days.

(21) Appl. No.: 17/490,311

(22) Filed: Sep. 30, 2021

(65) Prior Publication Data
US 2022/0232381 A1    Jul. 21, 2022

(30) Foreign Application Priority Data
Jan. 19, 2021    (CN) .......................... 202110065786.5

(51) Int. Cl.
  *H04W 12/08*    (2021.01)
  *G06N 20/10*    (2019.01)
(52) U.S. Cl.
  CPC ............ *H04W 12/08* (2013.01); *G06N 20/10* (2019.01)
(58) Field of Classification Search
  CPC .............................. H04W 12/08; G06N 20/10
  See application file for complete search history.

(56) References Cited

U.S. PATENT DOCUMENTS

| 2020/0245910 | A1 | 8/2020 | Mallas et al. |
| 2020/0374711 | A1* | 11/2020 | Honkasalo ............. G06N 3/045 |
| 2021/0328978 | A1* | 10/2021 | Buchanan ............... H04L 63/08 |

FOREIGN PATENT DOCUMENTS

| CN | 102223637 A | 10/2011 |
| CN | 108304877 A | 7/2018 |

(Continued)

OTHER PUBLICATIONS

Liu and Yan, "Improvement of Differential Evolution Algorithm and its Application Research", Jiangxi Science, 2018, vol. 36; doi: 10.13990/j.issn1001; 7 pages including English-language Abstract.

*Primary Examiner* — Umair Ahsan
(74) *Attorney, Agent, or Firm* — Maier & Maier, PLLC (57) ABSTRACT

An SVM-based secure access method for wireless terminals. Step 1, establish a wireless network security model based on the communication scenarios of the wireless terminal and the wireless base station; establish the channel feature vectors based on the wireless network security model and the frames received by the wireless base station; Step 2, use the pre-trained SVM model to examine the channel feature vectors of the frames, determining whether the frames are legitimate signals; Step 3, determine whether the wireless terminal with at least one frame sent is a legitimate terminal based on whether at least one of the frames sent is a legitimate signal. The frames sent by the wireless terminals that access the wireless base station are examined to effectively determine legitimate terminals by improving the SVM parameter combination optimization method of differential evolution and the differential evolution method with an adaptive improvement of the control parameters.

18 Claims, 6 Drawing Sheets

(56) References Cited

FOREIGN PATENT DOCUMENTS

| CN | 108718292 A | 10/2018 |
|---|---|---|
| CN | 110995721 A | 4/2020 |

\* cited by examiner

SVM-BASED SECURE ACCESS METHOD FOR WIRELESS TERMINALS

FIELD

The present invention relates to the field of wireless communication, and in particular, to an SVM-based secure access method for wireless terminals.

BACKGROUND 5G communication systems have been widely used nowadays, yet they are still facing a series of security challenges during their application. On the one hand, the security challenges of the 5G systems originate from whose inheritance of the 3G and 4G communication systems, such as the transmission of identity information in plain text and the leakage of authentication vectors. On the other hand, the evolution of network architecture has also brought many new challenges. For example, it is difficult for the core network to provide security protection in the security domain for the access network, and the heterogeneous fusion of the network will bring problems such as the incompatibility of security mechanisms.

Specifically, the security of 5G power services needs to rely on the credibility of the public network's 5G channels. However, due to the application of millimeter wave and Massive MIMO large-scale antenna technology in 5G communication systems, the system features of the 5G communication systems have undergone significant changes. For example, the amount of information in the physical layer of the 5G communication system has increased sharply, so as the degree of freedom of spatial transmission of signals, which will cause a sharp increase in interference signals relative to the legitimate signals. Due to the broadcasting features of the wireless channel, the rapid increase of interference signals creates new challenges for the communication security between the wireless power terminal and the wireless power base station. How to access power terminals in the 5G wireless communication environment safely and reliably has become an important issue.

In the prior art, when it comes to the secure access of wireless power terminals to wireless power base stations, the cellular security mechanisms are usually improved, encryption and decryption are performed with the help of upper-layer protocols, and the security of wireless power terminals accessing the base stations is enhanced through methods such as checking for deficiencies and "patching". However, in a 5G communication system, changes in system features not only require further proves for the theoretical basis pertaining to the security of the default physical layers that the security scheme relies on, but also make it difficult to guarantee the security of the channels that transmit the secret keys. Security solutions that rely on communication upper-layer protocols for information encryption and identity authentication will also consume a lot of system resources leading to an in increase in communication delays. At the same time, the authentication algorithm that relies on secret key generation to encrypt and decrypt information is also easy to be cracked by malicious attackers.

In order to solve the above problems, a new secure access method for wireless terminals is developed.

SUMMARY

In order to solve the deficiencies in the prior art, the purpose of the present invention is to provide an SVM-based secure access method for wireless terminals; by improving the SVM parameter combination optimization method of differential evolution and the differential evolution method with an adaptive improvement of the control parameters, the frames sent by the wireless terminals that access the wireless base station are examined to effectively determine legitimate terminals.

The present invention is achieved through the following technical solutions. An SVM-based secure access method for wireless terminals includes the following steps: Step 1, establish a wireless network model based on the communication scenarios of the wireless terminal and the wireless base station; establish the channel feature vectors based on the wireless network model and the frames received by the wireless base station; Step 2, use the pre-trained SVM model to examine the channel feature vectors of the frames, determining whether the frames are legitimate signals; Step 3: determine whether the wireless terminal with at least one frame sent is a legitimate terminal based on whether at least one of the frames sent is a legitimate signal.

Preferably, Step 1 further includes: the channel feature vectors established based on the frames received by the wireless base station include feature values of the distinguishable physical layer feature which are extracted from the frames related to the wireless network model.

Preferably, Step 1 further includes: the channel feature vectors include N feature values of the distinguishable physical layer feature.

Preferably, Step 2 further includes: the method for pre-training the SVM is: Step 2.1.1, establish a wireless network model based on the communication scenario of the wireless terminals and the wireless base station; Step 2.1.2, receive frames sent from the wireless terminals through the wireless base station, and extract the distinguishable physical layer feature related to the wireless network model from the frames as feature values; Step 2.1.3, determine the initial decision labels for the frames. The initial decision labels are used to set the wireless terminals, from which the frames are sent, as legitimate terminals or illegitimate terminals; Step 2.1.4, generate a sample set for training and testing based on the feature vectors established from the feature values of the frames and the initial decision labels, and use the training sample set to train the SVM model; Step 2.1.5, use the trained SVM to classify the training sample set.

Preferably, Step 2.1.4 and Step 2.1.5 further include: adopts the SVM parameter combination optimization method based on improved differential evolution to generate an SVM and obtain an optimized SVM.

Preferably, Step 2.1.5 further include:
update the feature values extracted from the frames when using the trained SVM to classify the training sample set.
includes.

Preferably, Step 2 further include: the method for examining the channel feature vectors of the frames is: Step 2.2.1, according to the SVM parameter combination optimization method based on improved differential evolution, identify the channel feature vectors of the initial frame and make preliminary determination on whether the wireless terminal that sends the initial frame is a legitimate terminal; Step 2.2.2, obtain the similarity between the channel feature vectors of the initial frame and that of the next frame in order to examine the next frame following the initial frame; Step 2.2.3, use the method in step 2.2.2 to examine the channel feature vectors of multiple frames of the frames, and to determine whether the wireless terminal is a legitimate terminal.

Preferably, Step 2.2.1 further includes: set the channel feature parameters $\tau_A=[\tau_{A,0}, \tau_{A,1} \ldots \tau_{A,N}]$ according to the physical layer features of the wireless base station, where A is a legitimate terminal, and N is the number of sampled samples of the frames. Use the channel feature parameters to identify the channel feature vector $\tau_r(1)$ of the initial frame received by the wireless base station. When the initial frame is identified to be a legitimate signal, that is, when $\tau_r(1)=\tau_A$, it is determined that the wireless terminal sending the initial frame is a legitimate terminal. When the initial frame is identified as an interference signal, that is, when $\tau_r(1)\neq\tau_A$, it is determined that the wireless terminal sending the initial frame is an illegitimate terminal.

Preferably, Step 2.2.2 and Step 2.2.3 further include: use the channel feature vector $\tau_r(1)$ or $\tau_r(i)$ of the frame that has been examined to examine the channel feature vector $\tau_r(2)$ or $\tau_r(i+1)$.

Preferable, use the SVM parameter combination optimization method based on improved differential evolution to identify the channel feature vectors of the initial frame, and to examine the channel feature vectors of multiple frames.

Preferable, based on the SVM parameter combination optimization method based on improved differential evolution, it includes the following steps: Step 11, set the value ranges for the penalty parameter and the kernel, and randomly generate initial populations based on the value ranges; Step 12, train and test the sample data based on the initial population to obtain sample classification results; Step 13, based on the sample classification results, calculate the number of classified samples and the number of misclassified samples, and use the number of classified samples and the number of misclassified samples to calculate the misclassification rate; Step 14, define the misclassification rate to be the fitness function of the population, and the population of the next generation is obtained by the differential evolution method with an adaptive improvement of the control parameters based on the fitness function of the population.

Preferably, the differential evolution method with an adaptive improvement of the control parameters includes the following steps:

Step 21, initialize the population and use the arc function to set the mutation operator and the crossover operator; Step 22, based on the mutation operator and crossover operator set in Step 21, perform mutation operation on the initial population in turn to find the trial candidate; Step 23, perform the crossover operation and the selection operation on the trial candidate generated by the mutation operation, as to produce the population of the next generation; Step 24, determine whether the population of the next generation satisfies the termination criterion; if the criterion is met, output the optimal solution; if not, return to step 22 until the criterion is satisfied.

Preferably, Step 21 further includes: set the mutation operator as $$F = 2 \cdot \sqrt{1-\left(\frac{g}{G}\right)^2},$$

and the crossover operator $$R = 1 - \sqrt{1-\left(\frac{g}{G}\right)^2},$$

here g is the current iteration number, G is the number of iterations to terminate, $F\in[0,2]$, $CR\in[0,1]$.

Preferably, Step 22 further includes: combine the base of the random mutation operation and the base of the mutation operation for the best solution in current population to perform the differential evolution mutation for finding the differences between two terms in order to obtain a trial candidate composed of mutated candidate solutions. The trial candidate would be $v_i(g)=\gamma\cdot x_{r1}(g)+(1-\gamma)\cdot x_{best}(g)+F\cdot[x_{r2}(g)-x_{r3}(g)]+F\cdot[x_{r4}(g)-x_{r5}(g)]$, where $$\gamma = \frac{F}{2},$$

$x_{r1}(g)$ is a random candidate of the current population, $x_{best}(g)$ is the best solution of the current population, best, r1, r2, r3, r4, r5 are candidates of the population different from each other.

Preferably, Step 23 further includes: perform a crossover operation according to the trial candidate to generate a new solution, calculate fitness function value of the population according to the new solution, merge the fitness function value with each candidate of the current population to produce the temporary population of the next generation, calculate the variance of fitness of the population and compare it with the variance threshold to determine whether or not to randomly generate candidate solutions to replace the temporary population of the next generation based on the new-born candidates; produce the population of the next generation when it is determined to do so.

Preferably, combine all candidates in the new solution and in the initial population, and sort all candidates according to their fitness function values, retain the top 10% of the candidates, and remove the bottom 10% of the candidates. Each of the candidates in the middle 80% is selected according to the greedy algorithm to produce the temporary population of the next generation.

Preferably, the variance of the fitness function value with each candidate of the population is $\delta^2=\Sigma_{i=1}^{N}|f_i(g)-f_{average}(g)|^2$, where N is the number of candidates in the population, $f_i(g)$ is the fitness function value of the i-th candidate, and $f_{average}(g)$ is the average fitness function value of the current population.

Preferably, preset the variance threshold $\tau$, and determine subsequent steps based on the current iteration number g and variance $\delta^2$. When the iteration number is half of the number of iterations to terminate, and the variances of M consecutive iterations $\delta^2\leq\tau$, determine that k new-born candidates should be randomly generated, and the temporary population of the next generation is replaced based on the k new-born candidates to produce the population of the next generation.

Preferably, the wireless base station is a wireless power base station, and the wireless terminal is a wireless power terminal.

The second aspect of the present invention further includes an SVM parameter combination optimization method based on improved differential evolution. The optimization method can be realized by adopting the SVM parameter combination optimization method based on improved differential evolution described in the SVM-based secure access method for wireless terminals in the first aspect of the present invention.

The third aspect of the present invention includes a differential evolution method with an adaptive improvement of the control parameters. The differential evolution method adopts the differential evolution method with an adaptive improvement of the control parameters described in the SVM-based secure access method for wireless terminals in the second aspect of the present invention.

Beneficial effects of the present invention are that, compared to the prior art, the SVM-based secure access method for wireless terminals of the present invention can use the signals, the channel physical layer feature and the improved support vector machine algorithm to solve the security problem of the physical layer of the wireless communication system that has not been considered in the prior art, saving system resources, and improving the accuracy and diversity of determining the legitimacy of wireless terminals. The present invention adopts an improved differential evolution algorithm (DE) to achieve the Support Vector Machines (SVM) parameter combination optimization. At the same time, based on the support vector machine algorithm and the pre-extracted feature vectors, establish the secure access authentication model for wireless terminals in the physical layer of the communication channel.

Beneficial effects of the present invention include:

1. The invention can not only be applied to the wireless power base station in the electric power private network to determine the legitimacy of the wireless power terminals, but can also be used in various general mobile communication services with wide application range and complete coverage.

2. The invention stays away from the traditional secret key authentication technology, effectively avoiding the complicated process of decrypting the authentication model through the upper layer protocol, thus it saves system resources, and resolves the safe access problem. At the same time, by directly performing secure access authentication at the physical layer, the authentication model is more difficult to decipher, and the security of accessing the wireless terminals is enhanced. In addition, the secure access authentication based on the physical layer feature does not need to rely on upper-layer communication protocols and does not require encryption and decryption; this saves a lot of communication resources and greatly reduces communication delay.

3. Based on the improved support vector machine algorithm, the present invention can adjust the obviousness of changes in the fitness function value on the optimization principle of minimizing the misjudgment rate of samples. In addition, the improved support vector machine algorithm avoids the process of inverting the sample matrix resulted by the adaptive beamforming algorithm to offset signal interference, thus reducing the complexity of the authentication model algorithm and improving the accuracy and stability of the algorithm.

4. The adaptive improvement method of the differential evolution algorithm based on the arc function proposed in the present invention can balance the global search ability and the local search ability, thus improving the search efficiency of the traditional differential evolution algorithm. In addition, through the candidate selection operation to protect the good and to eliminate the bad, the method can also improve the search efficiency while ensuring that good candidates are unelinimated and the group diversity is unlost. The improved differential evolution algorithm in the present invention can also prevent the algorithm from being trapped with a local optimum by randomly replacing candidate solutions.

Although the description of exemplary embodiments is comprehensively detailed and described with references to the accompanying drawings in the embodiments of the present invention, those of ordinary skill in the art should acknowledge that the same is by way of illustration and example only to help better understand the core ideas of the present invention and is not to be taken by way of limitation. On the contrary, any changes or modifications made based on the spirit of the present invention should fall within the scope of protection of the present invention.

DETAILED DESCRIPTION

To help better understand the technical solutions provided by the present invention, description of exemplary embodiments is comprehensively detailed below with references to the accompanying drawings in the embodiments of the present invention.

Figure 1:
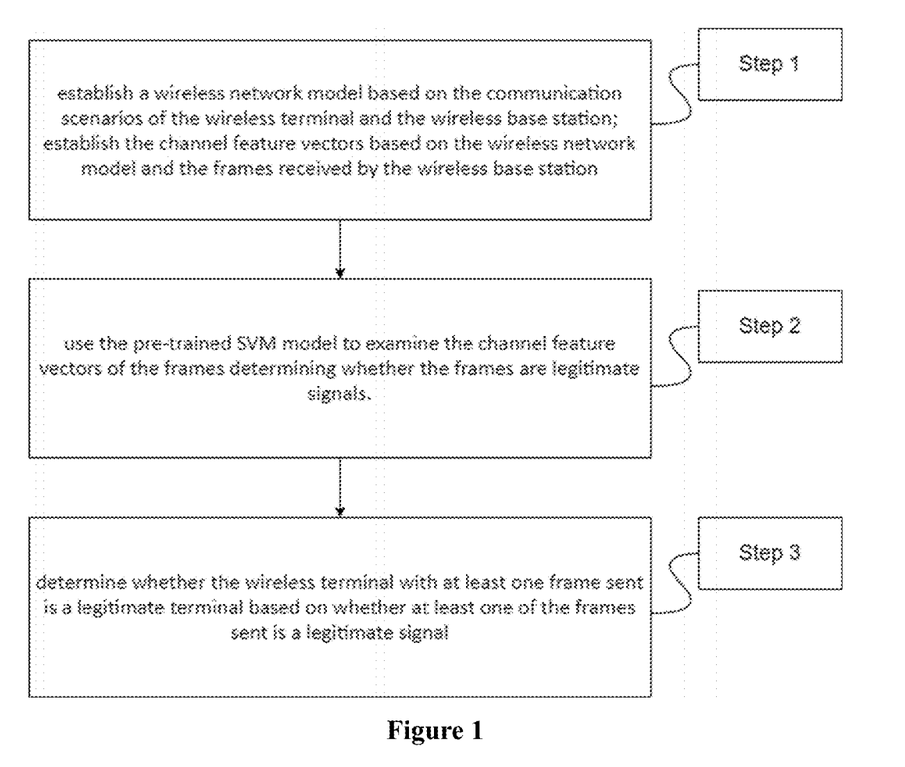
FIG. 1 is the schematic diagram of an SVM-based secure access method for wireless terminals of the present invention.

FIG. 1 is the schematic diagram of an SVM-based secure access method for wireless terminals the present invention. As shown in FIG. 1, the first aspect of the present invention relates to an SVM-based secure access method for wireless terminals, including Step 1 to Step 3.

Step 1, establish a wireless network model based on the communication scenarios of the wireless terminal and the wireless base station; establish the channel feature vectors based on the wireless network model and the frames received by the wireless base station.

For the part of the mobile communication access network, the wireless base station and multiple wireless terminals establish communication connections through antennas. The wireless communication signals received by the wireless base station include legitimate signals sent from legitimate wireless terminals along with illegitimate signals from illegitimate terminals. These illegitimate signals may come from unauthenticated wireless terminals, or may include some interference signals.

Preferably, the wireless base station is a wireless power base station, and the wireless terminal is a wireless power terminal. For example, in a private power service network, legitimate terminals include authenticated wireless power terminals, while illegitimate terminals may include those terminals that should not be included in the private power service network. The interference signals sent by these terminals need to be excluded by the wireless power base station through authentication. As such, legitimate signals can be accurately obtained and interference from illegitimate signals can be eliminated.

Specifically, the wireless network model established in Step 1 is a model of wireless network for solving security issues. Therefore, relevant model parameters indicate security issues and the level of security of the wireless network.

Step 2, use the pre-trained SVM model to examine the channel feature vectors of the frames, determining whether the frames are legitimate signals.

Specifically, the pre-trained SVM model is a pre-trained model for authentication using SVM. Using the pre-trained SVM model to examine the channel feature vectors of the frame is a process in which the wireless base station authenticates the legitimacy of the wireless terminals. The wireless terminals that pass the authentication check are legitimate terminals, and the signals sent by these terminals are legitimate signals. Wireless terminals that fail the authentication check are illegitimate terminals, and the signals sent by these terminals are illegitimate signals. Generally, the authentication check examines each frame of the wireless signals, and the signals are authenticated by extracting the channel feature vectors from the frames.

Step 3, determine whether the wireless terminal with at least one frame sent is a legitimate terminal based on whether at least one of the frames sent is a legitimate signal.

In order to accurately determine legitimacy of a wireless terminal, it is usually necessary to examine multiple frames from the wireless terminal, and determine its legitimacy through comprehensive analysis.

Figure 2:
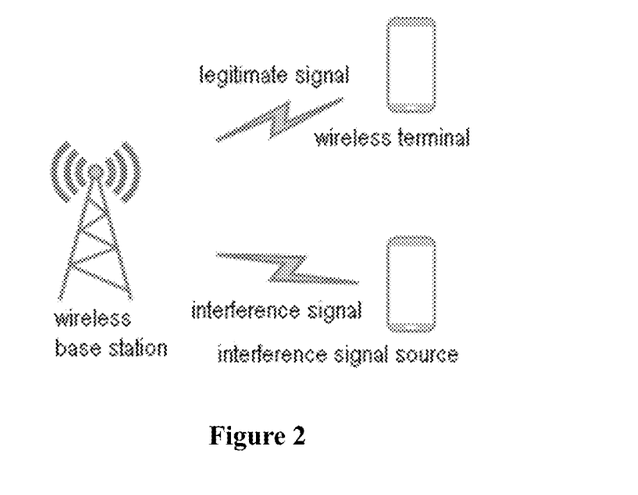
FIG. 2 is a schematic diagram of a communication scenario model of a 5G communication system in the SVM-based secure access method for wireless terminals of the present invention.

Specifically, Step 1 includes the following:

FIG. 2 is a schematic diagram of a communication scenario model of a 5G communication system in the SVM-based secure access method for wireless terminals of the present invention. As shown in FIG. 2, there is a power base station receiving end, a legitimate wireless power terminal, and an illegitimate interference signal source that interferes with the power base station in the communication scenario model. In order to receive wireless signals sent by the wireless terminal, the power base station using Massive MIMO technology can be configured with different antenna arrays. Based on the different antenna arrays configured, different channel feature parameters can be obtained. Assuming the channel feature parameter $\tau_A=[\tau_{A,0}, \tau_{A,1} \ldots, \tau_{A,N}]$, where A represents that the channel feature parameter is from a legitimate user, N represents the number of uniformly sampled samples from every frame.

When the legitimate terminal sends information to the wireless base station, the illegitimate terminal will send interference signals to attempt accessing the wireless base station. At the same time, the wireless base station will receive the wireless signals and determine which signal is a legitimate signal and which signal is an illegitimate interference signal. According to the setting of the channel feature parameters, the wireless base station can extract channel feature vectors from each frame received from each terminal. The channel feature vector is $\tau_t(m)=[\tau_{t,0}(m), \tau_{t,1}(m) \ldots, \tau_{t,N}(m)]$ in that t represents the identity of the wireless terminal sending the frame, m is the numbering of frames to be detected, that is, the m-th frame sent by the wireless terminal Preferably, the channel feature vectors established based on the frames received by the wireless base station include feature values of the distinguishable physical layer feature which are extracted from the frames related to the wireless network model. Moreover, the channel feature vectors include N feature values of the distinguishable physical layer feature.

It is worth noting that when selecting the feature values, a feature value that can fully characterize the physical layer feature of the channel can be selected. These feature values can distinguish the physical layer features of the channel from the physical layer features of other channels. In an embodiment of the present invention, parameters such as the signal arrival moment, the signal angle, and the large-scale fading factor of the signal can be extracted as feature values from the physical layer of the wireless communication system, thereby authenticating the legitimacy of the access signal.

Specifically, in general, illegitimate interference signals cannot accurately measure or imitate channel conditions between legitimate terminals and wireless base stations in wireless communication systems. This is because the location of the legitimate terminal and the illegitimate signal source is usually different, which leads to a multiple-wavelength distance between the illegitimate signal source and the legitimate terminal in a 5G communication system that communicates using millimeter wave. Therefore, the wireless channel through which the illegitimate signal source and the legitimate terminal send signals to the wireless base station in the 5G communication system are different. Experimental tests on 5G communication systems in an indoor environment have shown that when the distance between two signal sources exceeds 12.5 cm, the two signal sources will transmit signals through different wireless channels. Therefore, the legitimacy of the wireless terminals can be determined based on the signal arrival moment and signal angle extracted from the physical layer.

In addition, the two consecutive channel frames sent by the wireless terminal to the wireless base station should be consistent unless the wireless terminal device is moving at a high speed. When the spatial distance between two signals is greater than half a wavelength, which is a very common phenomenon in millimeter wave transmission systems, the signals will be rapidly de-correlated. When the spatial distance between the two signals is 1 to 2 wavelengths in length, the fading paths of the two signals can be considered independent of each other. Therefore, the legitimacy of the wireless terminal can be determined based on the large-scale fading factor of the signal extracted from the physical layer. In judging this parameter, the channel feature vectors of multiple frames can be compared. When the channel feature vector of the current frame has been authenticated, the legitimacy of the channel feature vector of the next frame can be determined.

Specifically, Step 2 includes the following:

According to Step 1, determining whether the frame is a legitimate signal can be expressed as a general hypothesis test problem. The test condition can be $$\begin{cases} H_0 : \tau_t(m) = \tau_A \\ H_1 : \tau_t(m) \neq \tau_A \end{cases}$$

which can also be expressed as $$\begin{cases} H_0: \tau_t(1) \text{ is from Alice} \\ H_1: \tau_t(1) \text{ is not from Alice} \end{cases}.$$

According to the hypothesis test theory, when the hypothesis is accepted, it indicates that the signal comes from a legitimate power terminal; otherwise the signal is an illegitimate interference signal. In the embodiment of the present invention, the channel feature parameters received by the wireless base station can be used to train the support vector machine, and to verify the received channel vector. This requires to pre-train the support vector machine. In the present invention, in order to more accurately authenticate the wireless terminal, the support vector machine method used in the present invention is improved on the basis of the support vector machine algorithm in the prior art.

In the prior art, the principle of SVM is to find an optimal classification hyperplane in the feature space of the data to separate two types of data. Since the data to be classified usually has anomalies that cannot meet the ideal linear separation constraint, the penalty parameter C can be introduced as the adjustment weight to adjust the attention degree that the classification hyperplane has for classification error. When the value of the penalty parameter C is large, the algorithm's penalty for misclassification will also increase; this may cause the model to predict the training data very well but unknown data poorly, known as the "overfitting" phenomenon. When the value of the penalty parameter C is small, the algorithm will reduce the penalty for misclassification; this may cause the "underfitting" phenomenon. In addition, there also exists problems for SVM to perform nonlinear classification. When SVM solves nonlinear classification problems, it usually uses a kernel to make nonlinear changes. The data that cannot be correctly linearly classified in the conventional process is mapped to a new high-dimensional feature space using the kernel, transforming the nonlinear problem into a linear problem; it then follows that the linear classification method will be used to find an optimal classification hyperplane in the new space to divide the data. However, the mapping performance of the kernel is affected by the kernel parameter $\delta$. Taking the Gaussian kernel as an example, the larger the $\delta$, the weaker the data division ability that the Gaussian kernel will have; and the smaller the $\delta$, the stronger the data division ability that the Gaussian kernel will have.

According to the prior art, the main problem faced by the current SVM algorithm is the selection of the kernel parameter $\delta$ and the penalty parameter C, both affecting the learning ability, the classification accuracy and the generalization performance of the algorithm. So far, there are no relevant theories nor selection criteria for choosing these two parameters in either theoretical research or practical applications. Most of the selections have been made based on past experience or a large number of cross-validation experiments, which not only consume an excessive amount of time and computing power, but may also not guarantee the optimal parameter combination in the end.

Figure 3:
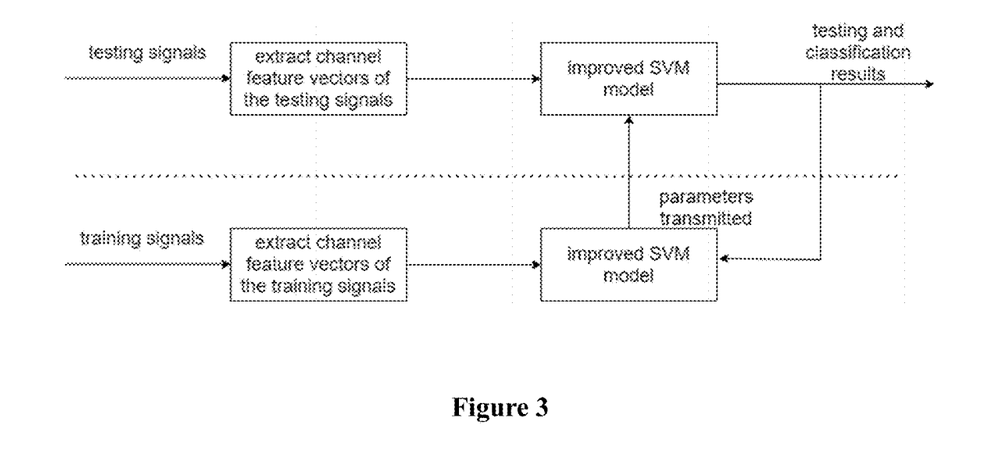
FIG. 3 is the schematic diagram of the experiment process for the secure access authentication method based on the improved SVM in the SVM-based secure access method for wireless terminals of the present invention.

Preferably, FIG. 3 is the schematic diagram of the experiment process for the secure access authentication method based on the improved SVM in the SVM-based secure access method for wireless terminals of the present invention. As shown in FIG. 3, the SVM parameter combination optimization method based on improved differential evolution includes the following steps:

Step 11, set the value ranges for the penalty parameter and the kernel, and randomly generate initial populations based on the value ranges.

Various parameters can be set when initializing the populations. Specifically, the parameters of the algorithm include the number of iterations to terminate L, the population size N, the mutation operator F, the crossover operator CR, the variance threshold $\tau$, the threshold of iteration number M for determining the local optimum, the number k of randomly generated candidate solutions, and so forth.

At the same time, the value ranges for the penalty parameter C and kernel parameter $\delta$ can also be set, and randomly generate N groups of feature vectors (C, $\delta$) as the initial population $x_i(g)$, with each feature vector composing of the penalty parameter C and the kernel parameter $\delta$ according to the value ranges.

Step 12, train and test the sample data based on the initial population to obtain sample classification results.

Using the feature vector (C, $\delta$) composed of the penalty parameter C and the kernel parameter $\delta$ generated in Step 11 as the parameters of the SVM algorithm, train and test the sample data to obtain the sample classification results.

Step 13, based on the sample classification results, calculate the number of classified samples and the number of misclassified samples, and the number of classified samples and the number of misclassified samples to calculate the misclassification rate.

According to the sample classification results from Step 12, the total number of each of the samples after classification can be obtained. Moreover, by comparing the sample classification results with the sample data, the number of misclassified samples in the two categories of samples can be obtained. In one embodiment, the total numbers of the two categories of samples after classification are respectively recorded as $B_1$ and $B_2$, and the number of misclassified samples in the two categories of samples are respectively recorded as $A_1$ and $A_2$.

Step 14, the misclassification rate is defined as the fitness function of the population, and the population of the next generation is obtained by the differential evolution method with an adaptive improvement of the control parameters based on the fitness function of the population.

In order to find the optimal parameter combination (C, $\delta$) from the initial population, the fitness function of the population can be defined as the misclassification rate, and the minimum misclassification rate can be calculated to obtain the optimal parameter combination. The minimum misclassification rate can be calculated as min $$f = \alpha \cdot \left( \frac{A_1}{B_1} + \frac{A_2}{B_2} \right),$$

where $\alpha$ is the scaling factor, which is used to adjust the significance in value changes of the fitness function.

After calculating the values of the fitness function, the differential evolution method can be used to successively carry out a mutation operation on the initial population to generate the trial candidate $v_i(g)$, a crossover operation to generate a new solution $u_i(g)$, and a selection operation to produce the population of the next generation $x_i(g+1)$. The specifics of this calculation method will be described in detail below, thus will not be repeated here.

Figure 4:
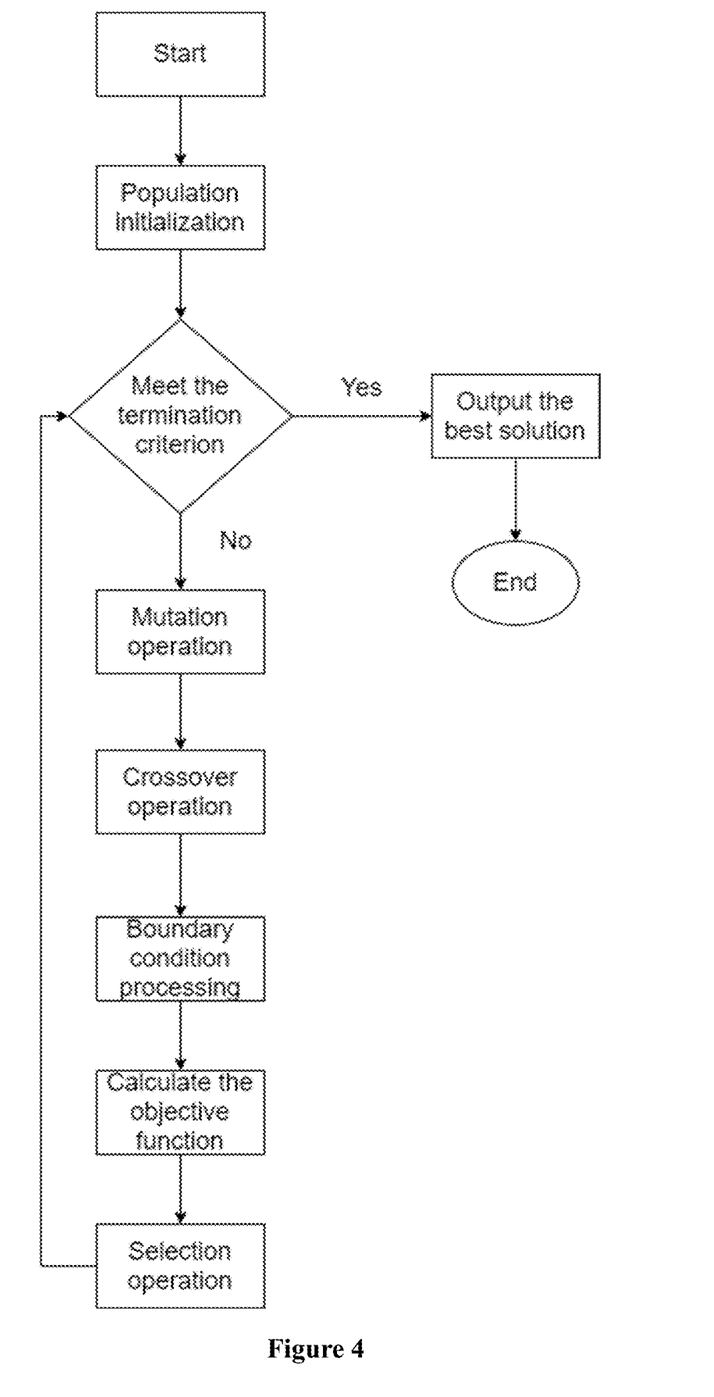
FIG. 4 is a schematic diagram of a differential evolution algorithm in the prior art of the present invention.

For the aforesaid SVM parameter combination optimization method, the differential evolution method in the prior art can be used to generate the population of the next generation, leading to the optimal solution. FIG. 4 is a schematic diagram of a differential evolution algorithm in the prior art of the present invention. As shown in FIG. 4, the differential evolution algorithm in the prior art is based on the swarm intelligence theory which entails an algorithm for intelligent search through mutual cooperation and competition among candidates in a swarm. This algorithm is often used to solve optimization problems of targeted functions. For example, to optimize the minimum function min f (x), assume that there is a vector $x=[x_1, x_2, \ldots x_d]$, where d is the dimension of this function optimization problem. For this vector x, its parameter variable of the k-th dimension has a certain value range of $l_k \leq x_k \leq u_k$ (k=1, 2, 3 . . . d). Each candidate in the population calculated by the differential evolution algorithm is a solution to this function optimization problem, for example, one of the solutions would be the i-th candidate $x_i=[x_{i1}, x_{i2}, \ldots x_{id}]$. Randomly select candidates from the initial population from the value range to establish the initial selection point for the optimization search. It can be assumed that the initial population conforms to a uniform distribution, such that the initial population is $x_{ik}(0)=\text{rand}[0,1] \cdot (u_k - l_k)$, i=1, 2 . . . N, where rand[0,1] represents a random number between 0 and 1, and N represents the population size of the initial population.

The operation of adding the weighted difference vector of two candidates in the population to the third candidate is called "mutation". The mutation operation can start after the population is initialized. The mutated component of the standard differential evolution algorithm is the differential vector of the previous generation. Each candidate $x_i(g)$ of the current population will undergo mutation to produce a candidate solution $v_i(g)$, where g represents the number of generations to which the population has evolved. In the prior art, the methods for generating mutated candidates for different differential evolution algorithms are different. The mutation operation of the standard differential evolution algorithm is $v_i(g)=x_{r1}(g)+F \cdot [x_{r2}(g)-x_{r3}(g)]$, where i, r1, r2, r3 represent disparate candidates. F is a mutation operator, which is a real constant number with a value range of [1,2]. The mutation operator F can be used to control the amplification effect of the deviation variables. The larger the F, the more $x_{r1}(g)$ will mutate, and the richer the diversity that the population is going to have.

At present, there is a variety of mutation mechanisms in differential evolution algorithms, but all mutation mechanisms include two important parameters, namely, the basic type of the mutation operation and the number of differential terms during the mutation operation. The basic type of mutation operation can usually be distinguished by randomly selecting the base of the mutation operation rand or selecting the best solution of the current population as the base of the mutation operation best. During the mutation operation, the number of differential terms can be 1 or 2. Therefore, the mutation mechanism in the standard differential evolution algorithm can be recorded as DE/a/b, where DE represents the differential evolution algorithm, a represents the basic type of the mutation operation, and b represents the number of differential items during the mutation operation. Common mutation mechanisms include mutation mechanism 1 to mutation mechanism 4.

Specifically, mutation mechanism 1 is DE/best/1, its formula is $v_i(g)=x_{best}(g)+F \cdot [x_{r1}(g)-x_{r2}(g)]$; mutation mechanism 2 is DE/best/2, its formula is $v_i(g)=x_{best}(g)+F \cdot [x_{r1}(g)-x_{r2}(g)]+F \cdot [x_{r3}(g)-x_{r4}(g)]$; mutation mechanism 3 is DE/rand/2, its formula is $v_i(g)=x_{r1}(g)+F \cdot [x_{r2}(g)-x_{r3}(g)]+F \cdot [x_{r4}(g)-x_{r5}(g)]$; mutation mechanism 4 is DE/target-to-best/1, its formula is $v_i(g)=x_i(g)+F \cdot [x_{best}(g)-x_i(g)]+F \cdot [x_{r1}(g)-x_{r2}(g)]$. In the formulas above, $x_{best}$ represents the best solution in the current population, each of i, r1, r2, r3, r4, r5 represents a different candidate in the population other than the best solution.

When the mutation operation is completed, the differential evolution algorithm in the prior art will immediately start the crossover operation. The crossover operation can mix the parameters of the mutated candidate with another predetermined target candidate to generate test candidates according to certain rules. Therefore, the crossover operation can increase the diversity of the candidates in the population to avoid premature convergence. For each candidate generated in the mutation operation, a uniformly distributed random number between 0 and 1 can be generated. Based on the criteria of the crossover operation, one can choose to accept the corresponding components of the target candidate or keep the corresponding components of the current candidate. The crossover operation is $u_i(g)=[u_{i1}(g), u_{i2}(g), \ldots u_{id}(g)]$ where exists $$u_{ij}(g) = \begin{cases} v_{ij}(g), & \text{if } randb(j) \leq CR \text{ or } j = rnbr(i) \\ x_{ij}(g), & \text{if } randb(i) > CR \text{ or } j \neq rnbr(i) \end{cases},$$

in which (i=1, 2, 3 . . . N; j=1, 2, 3 . . . d). In the above formulas, randb(j) is used to represent the j-th generated random number between [0,1], $rnbr(i) \in (1, 2, 3 \ldots d)$ represents a randomly selected sequence, which guarantees that $u_{ij}(g)$ obtains at least one parameter from $v_{ij}(g)$, the crossover operator $CR \in [0,1]$.

It can be seen from the crossover operation formula that the value of CR affects the diversity and convergence speed of the population. The larger the CR, the greater the probability of randb(j)≤CR, the more parameters in $u_{ij}(g)$ are provided by $v_{ij}(g)$, therefore the more conducive to local search and accelerating the rate of convergence. On the contrary, the smaller the CR, the more diverse the population, and the more conducive to the global search.

After the crossover operation is completed, the differential evolution algorithm in the prior art will also perform selection operations. Specifically, if the cost function of the test vector is lower than the cost function of the target vector, the test vector can be used to replace the target vector in the next generation for selection. All vectors in the population must perform this operation in turn, so that the same number of competitors will appear in the next generation. The selection operation can determine whether $u_{ij}(g)$ can replace $x_{ij}(g)$ to be the candidates in the population of the next generation. Assuming that the fitness function value of $u_{ij}(g)$ is p, and the fitness function value of $x_{ij}(g)$ is q, and the larger the fitness function value, the better. The differential evolution algorithm accords to the greedy principal, and compares the fitness function value of $u_{ij}(g)$ with the fitness function value of $x_{ij}(g)$; the winner becomes the candidate in the population of the next generation $$x_{ij}(g+1) = \begin{cases} x_{ij}(g), q > p \\ u_{ij}(g), q \leq p \end{cases}.$$

In turn, the greedy principle can ensure that the population of the g+1-th generation is better or the same as that of the g-th generation, so that the gradual search can find the optimal solution. By following such a search step-by-step, the optimal solution can be found.

The minimization process can be recorded by evaluating the optimal parameter vector of each generation during the evolution process. Therefore, using random deviation perturbation for candidate solution generation, an ideal convergence result can be obtained, which leads the indexing process to approach the global optimum.

According to the description above, the differential evolution algorithm in the prior art includes the steps of: initializing the population, setting relevant parameters which include the maximum iteration number L, the population size N, the mutation operator F and the crossover operator CR, etc. At the same time, the fitness function value corresponding to each candidate in the population is calculated. Select the solution at random, start the mutation operation, and generate a trial candidate. Performing the crossover operation on the trial candidate with the current solution to generate a new solution. The newly obtained solution is compared with the corresponding position of the current solution, and the candidate with a better fitness function value is selected as the candidate in the population of the next generation. If the termination condition is met, output the optimal solution; otherwise go to Step 2.

However, the differential evolution algorithm in the prior art also has apparent limitations, yet the limitations can be minimized by analyzing the mutation operation. Under the condition of mutation mechanism 1, $x_{best}(g)$ is the best solution in the current population, that is, the temporary optimal solution. As the operations of the evolution algorithm smoothly progresses, other candidates will accelerate to move closer to the best solution. At this time, mutation and crossover operations will hardly increase the diversity of the population, and will cause the differences between candidates in the population to gradually diminish. Therefore, if $x_{best}(g)$ is a local optimal solution of the function at this time, it will be difficult for the candidates in the population to be out of the local range affected by $x_{best}(g)$, which will cause the differential evolution algorithm to be trapped with the local optimal solution, leading to the phenomenon of premature convergence. Even if the mutation operation $v_i(g)=x_{r1}(g)+F \cdot [x_{r2}(g)-x_{r3}(g)]$ or $v_i(g)=x_i(g)+F \cdot [x_{best}(g)-x_i(g)]+F \cdot [x_{r1}(g)-x_{r2}(g)]$ is used during the mutation process in the differential evolution algorithm described above, it is easy for a candidate to be the local optimal solution during the evolution process, leading to slow and premature convergence. If there is a local optimal solution, it will be difficult to search for the global optimal solution.

According to $v_i(g)=x_{r1}(g)+F \cdot [x_{r2}(g)-x_{r3}(g)]$, the mutation operator F, namely the mutation scaling factor, is the key to control the influence of the deviation variable. The larger the F, the smaller the correlation between $v_i(g)$ and $x_{r1}(g)$, the more in-depth the variation and the richer the population diversity will be. At the same time, according to $$u_{ij}(g) = \begin{cases} v_{ij}(g), & \text{if } randb(j) \leq CR \text{ or } j = rnbr(i) \\ x_{ij}(g), & \text{if } randb(i) > CR \text{ or } j \neq rnbr(i) \end{cases},$$

it can be seen that the value of the crossover operator CR, namely the crossover probability factor, directly affects the population. The larger the CR, the more $v_{ij}(g)$ will contribute to $u_{ij}(g)$. When CR=1, $u_{ij}(g)=v_{ij}(g)$, which is conducive to the local search; the smaller the CR, the less $v_{ij}(g)$ will contribute to $u_{ij}(g)$. When CR=0, $u_{ij}(g)=x_{ij}(g)$, which is conducive to maintaining the diversity of the population and the global search. It can be seen that the choice of the control parameters of the differential optimization algorithm has a great influence on the search performance of the algorithm. The mutation operator F and the crossover operator CR can adjust the algorithm's search without affecting the search efficiency of the algorithm.

In the differential evolution algorithm, the main control parameters of the algorithm also include the population size N. The population size N also has a certain impact on the search result of the algorithm. The larger the N, the better the optimal solution of the global search. Yet with the increase of the population size, the computing time and workload will inevitably increase greatly, resulting the algorithm's search to be inefficient.

Generally, the differential optimization algorithm in the prior art takes a fixed value for F and CR based on experience. Obviously, for different function optimization problems, the fixed value approach cannot elicit the best performance of the algorithm.

Figure 5:
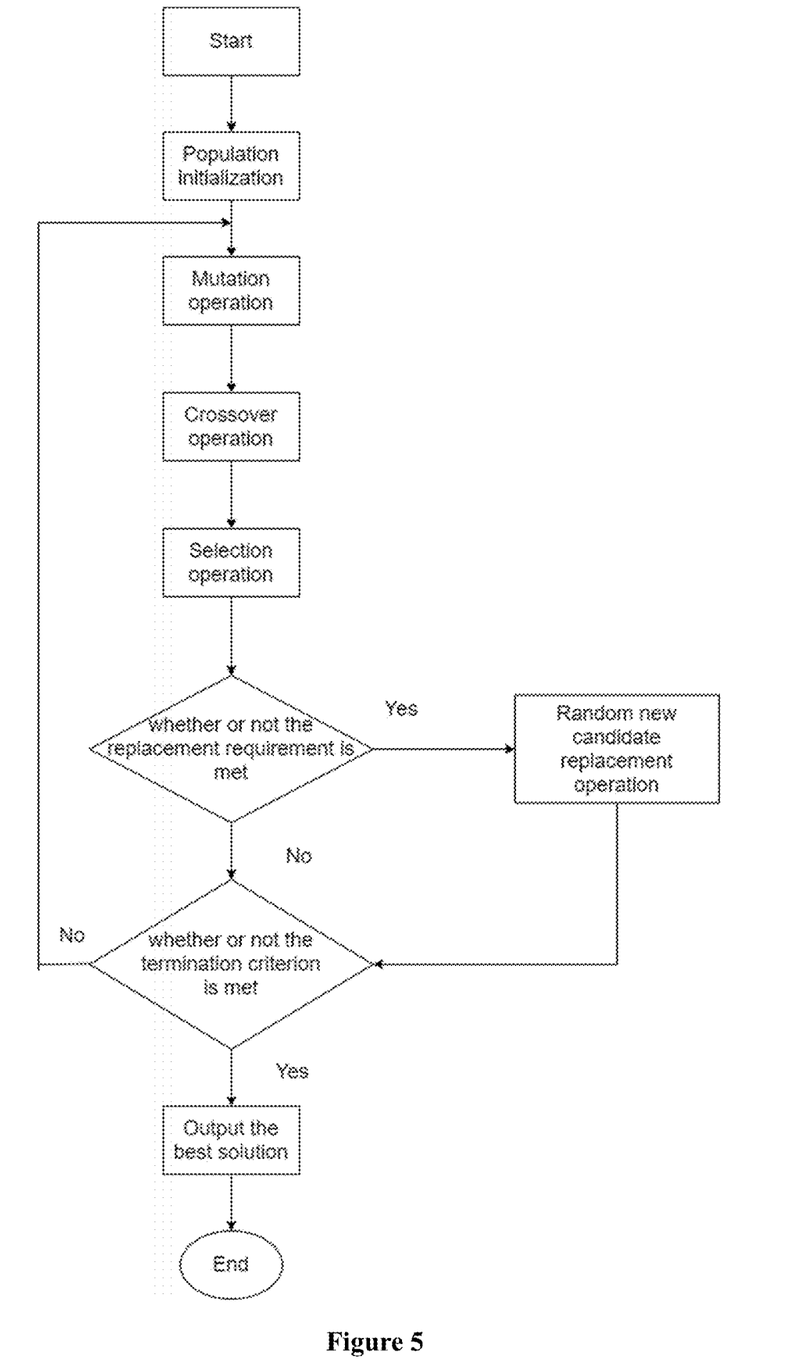
FIG. 5 is a schematic diagram of the differential evolution method with an adaptive improvement of the control parameters in the SVM-based secure access method for wireless terminals of the present invention.

Therefore, the present invention provides the differential evolution method with an adaptive improvement of the control parameters. FIG. 5 is a schematic diagram of the differential evolution method with an adaptive improvement of the control parameters in the SVM-based secure access method for wireless terminals of the present invention. As shown in FIG. 5, the differential evolution method with an adaptive improvement of the control parameters includes Step 21 to Step 24.

Step 21, initialize the population and use the arc function to set the mutation operator and the crossover operator.

Based on the prior art, in order to enhance the performance of the differential evolution algorithm while avoiding premature convergence, the parameter F is required to maintain a large value during the early searching stage of the differential evolution algorithm to increase the differences amongst candidates and reduce the probability of the algorithm being trapped with the local optimum. Yet during the later searching stage of the differential evolution algorithm, the parameter F is required to take a smaller value to make the algorithm searches towards the optimal solution and accelerate the speed of convergence. The requirement for the parameter CR is the opposite. During the early stage of the differential evolution algorithm, the parameter CR should be kept at a smaller value, and during the later stage of the differential evolution algorithm, the parameter CR should be kept at a larger value. In this way, the global search can be enhanced in the early stage of the differential evolution algorithm, the search interval of the global optimal solution can be located, unnecessary calculations can be reduced, and the search of the optimal solution can be accelerated in the later stage of the differential evolution algorithm.

The advantage of the arc function is that its gradient is gentle during the early stage and elevates rapidly during the later stage, which suits this algorithm very well. Therefore, in Step 21, an arc-based function is proposed. Based on the arc function, the mutation operator and the crossover operator can balance the global search ability and the local search ability, thereby improving the search efficiency of the differential evolution algorithm.

Preferably, set the mutation operator as $$F = 2 \cdot \sqrt{1 - \left(\frac{g}{G}\right)^2},$$

and the crossover operator $$R = 1 - \sqrt{1 - \left(\frac{g}{G}\right)^2},$$

where g is the current iteration number, G is the number of iterations to terminate, F∈[0,2], CR∈[0,1]. By using the aforesaid two formulas, associate the value of the mutation operator and the value of the crossover operator with the current iteration number respectively.

Step 22, based on the mutation operator and crossover operator set in Step 21, perform mutation operation on the initial population in turn to find the trial candidate $v_i(g)$.

Preferably, the base of the random mutation operation and the base of the mutation operation for the best solution in current population can be combined to perform the differential evolution mutation for finding the differences between two terms in order to obtain a trial candidate composed of mutated candidate solutions. The trial candidate would be $v_i(g)=\gamma \cdot x_{r1}(g)+(1-\gamma)\cdot x_{best}(g)+F\cdot[x_{r2}(g)-x_{r3}(g)]+F\cdot[x_{r4}(g)-x_{r5}(g)]$, where $$\gamma = \frac{F}{2},$$

$x_{r1}(g)$ is a ranaom member of the current population, $x_{best}(g)$ is the best solution of the current population, best, r1, r2, r3, r4, r5 are members of the population different from each other.

As mentioned above, the commonly used mutation mechanisms DE/best/2 and DE/rand/2 of the standard differential evolution algorithm can be combined, so that the mutation mechanism focuses more on the random member $x_{r1}(g)$ during the early searching stage to maintain the diversity of the population, and focuses more on the current best solution $x_{best}(g)$ during the later searching stage to accelerate the speed of convergence.

Step 23, perform the crossover operation and the selection operation on the trial candidate $v_i(g)$ generated by the mutation operation, as to produce the population of the next generation.

Preferable, Step 23 further includes: perform a crossover operation according to the trial candidate to generate a new solution $u_i(g)$, calculate fitness function value of the population according to the new solution, merge the fitness function value with each member of the current population to produce the temporary population of the next generation, calculate the variance of fitness of the population and compare it with the variance threshold to determine whether or not to randomly generate candidate solutions to replace the temporary population of the next generation based on the new-born members; produce the population of the next generation when it is determined to do so.

In an embodiment of the present invention, an improved scheme for the selection operation of the standard differential evolution algorithm is proposed to protect the good and to eliminate the bad, which improves the search efficiency while ensuring that good members are not eliminated nor the diversity of the population is lost.

In the prior art, in order to ensure that the evolution progresses in the correct direction, the selection operation of the differential evolution algorithm is based on the greedy principle, and the generated fitness function value of $u_{ij}(g)$ is compared with the fitness function value of $x_{ij}(g)$ one-by-one. This can ensure that the population of the next generation is not worse than the population of the previous generation, that is, when the fitness function value of $u_{i1}(g)$ is better than $x_{i1}(g)$, $x_{i1}(g)$ will be eliminated; but if the fitness function value of $x_{i1}(g)$ is the best or comparatively better than the remaining members, it means that two good members are compared with each other, and a comparatively better trial candidate will inevitably be lost. This is not conducive to conducting the search in a better direction, and it will also reduce the search efficiency of the algorithm.

Preferably, in the present invention, combine all members in the new solution $u_i(g)$ and in the initial population $x_i(g)$, and sort all members according to their fitness function values, retain the top 10% of the members, and remove the bottom 10% of the members. Each of the members in the middle 80% is selected according to the greedy algorithm to produce the temporary population of the next generation $t_i(g+1)$.

In an embodiment, combine all members of $u_i(g)$ and $x_i(g)$, with a total of 2N members, and sort them according to the fitness function value. Retain the top 10% of the members, and remove the bottom 10% of the members. For the remaining 80% of the members, the standard selection mechanism is used to compare and select each of them on a one-to-one basis, and the number of members in the population N remains unchanged. If there are members on surplus, these members will be sorted and eliminated according to the fitness function value, and eventually form a new generation of population. This method can not only retain good members and avoid the occurrence of degeneration, but also accelerate the speed of differential evolution due to the elimination of bad members.

In addition, in the present invention, in order to prevent the algorithm from being trapped with a local optimum, a random candidate solution replacement operation based on the variance of the population's fitness level is proposed.

The reason of the standard differential evolution algorithm being trapped with a local optimum is that as the iteration number increases, the differences between populations will gradually diminish, and a focusing phenomenon appears. Although the self-adaptive differential evolution algorithm with two-way random multi-strategic mutation can accelerate the optimization process, it is still hard to move out of the local optimum, leading to premature convergence.

Therefore, the variance of the fitness function value with each member in the population is introduced in an embodiment of the present invention. Assuming that N is the number of members in the population, $f_i(g)$ is the fitness function value of the i-th member, and $f_{average}(g)$ is the average fitness function value of the current population, then the variance of the fitness function value with each member of the population is $\delta^2=\Sigma_{i=1}^{N}|f_i(g)-f_{average}(g)|^2$. The variance of the fitness function value with each member $\delta^2$ is used to describe the state of aggregation of the current population. The larger the $\delta^2$, the greater the differences are amongst the members of the population; the smaller the $\delta^2$, the more severe the focusing phenomenon is. If $\delta^2=0$, then the algorithm is likely to be trapped with a local optimum. In order to allow the algorithm to move out of the local optimal solution and to continue with an effective search, a threshold τ can be set for the variance.

Preferably, preset the variance threshold τ, and determine subsequent steps based on the current iteration number g and variance $\delta^2$. When the iteration number is half of the number of iterations to terminate, and the variances of M consecutive iterations $\delta^2 \leq \tau$, determine that k new-born members should be randomly generated, and the temporary population of the next generation is replaced based on the k new-born members to produce the population of the next generation.

In one embodiment, it can be assumed that the set number of iterations to terminate is L, the number of times when $\delta^2 \leq \tau$ is recorded as count; every time when $\delta^2 \leq \tau$, count=count+1; every time when $\delta^2 > \tau$, count=count+0. Before iterating to [L/2] times, if there exists $\delta^2 \leq \tau$ for M consecutive iterations, that is, count=M, it can be that the algorithm has been trapped with the local optimum, and k candidate solutions will be randomly generated to replace the first to k-th members in the current population. The operator H means rounding down, for example, [3.6]=3. At the same time, relevant parameters of the algorithm can be set as follows $\tau \in [0,1]$, $M \in [5,10]$, $$k \leq \left[\frac{N}{10}\right].$$

Finally, determine whether to perform the replacement operation on random new-born members based on the variance of the fitness function value with each member. Let the population after the replacement operation be $s_i(g+1)$. If no replacement operation is needed, the temporary population of the next generation $t_i(g+1)$ is going to be the population of the next generation $x_i(g+1)$; otherwise $s_i(g+1)$ is going to be the population of the next generation $x_i(g+1)$.

Step 24, determine whether the population of the next generation satisfies the termination criterion. If the criterion is met, output the optimal solution; if not, return to step 22 until the criterion is satisfied.

Preferably, the method for pre-training the SVM is:

Step 2.1.1, establish a wireless network model based on the communication scenario of the wireless terminals and the wireless base station;

Step 2.1.2, receive frames sent from the wireless terminals through the wireless base station, and extract the distinguishable physical layer feature related to the wireless network model from the frames as feature values.

Step 2.1.3, determine the initial decision labels for the frames. The initial decision labels are used to set the wireless terminals, from which the frames are sent, as legitimate terminals or illegitimate terminals.

Step 2.1.4, generate a sample set for training and testing based on the feature vectors established from the feature values of the frames and the initial decision labels, and use the training sample set to train the SVM model.

Step 2.1.5, use the trained SVM to classify the training sample set and compare the results to see if they meet the requirements.

Specifically, establishing the SVM model may include the following four stages: the preprocessing stage for the physical layer feature, the training and learning stage for the improved support vector machine, the testing stage, and the re-learning stage.

Based on the physical layer feature of the 5G communication system, extract the feature values ($x_1, x_2, x_3 \ldots x_m$) of the signal; at the same time, constitute feature vectors using the initial decision labels $y_k$ which are also used to determine the legitimacy of the signals, and regard it as a training sample set. The support vector machine is trained offline through the known physical layer feature vectors in the set, and the optimal hyperplane for classification can be found by solving the quadratic programming equation. Extract the features of the physical layer feature of the received signal, group them into a feature vector, and input it into the trained improved support vector machine algorithm authentication model for authentication and identification, so as to determine whether the source of the received signal is legitimate or not. Among them, the process of online classification using the trained SVM model is the process of making classification decisions on the test vector.

Preferably, the present invention adopts the SVM parameter combination optimization method based on improved differential evolution to generate an SVM and obtain an optimized SVM.

Preferably, the trained SVM can also be used to update the feature values extracted from the frames to optimize the SVM. In an embodiment of the present invention, the obtained feature vectors that have been authenticated may be used as training sample set to continue training the support vector machine. This approach takes full advantage of the channel information, obtains the physical layer feature of the signal sent by the legitimate terminal, and updates the stored feature vectors, so that it can still ensure that the signals from the legitimate power terminals and the illegitimate interference signals are accurately distinguished, serving the purpose of safe and reliable access between the signals from the legitimate power terminals and the power base stations.

Preferably, the method for examing the channel feature vectors of the frames is:

Step 2.2.1, according to the SVM parameter combination optimization method based on improved differential evolution, identify the channel feature vectors of the initial frame and make preliminary determination on whether the wireless terminal that sends the initial frame is a legitimate terminal.

Preferably, Step 2.2.1 further includes setting the channel feature parameters $\tau_A = [\tau_{A,0}, \tau_{A,1} \ldots \tau_{A,N}]$ according to the physical layer features of the wireless base station, where A is a legitimate terminal, and N is the number of sampled samples of the frames. The channel feature parameters are used to identify the channel feature vector $\tau_t(1)$ of the initial frame received by the wireless base station. When the initial frame is identified to be a legitimate signal, that is, when $\tau_t(1) = \tau_A$, it is determined that the wireless terminal sending the initial frame is a legitimate terminal. When the initial frame is identified as an interference signal, that is, when $\tau_t(1) \neq \tau_A$, it is determined that the wireless terminal sending the initial frame is an illegitimate terminal.

Step 2.2.2, obtain the similarity between the channel feature vectors of the initial frame and that of the next frame in order to examine the next frame following the initial frame.

Specifically, the channel feature vector $\tau_t(1)$ or $\tau_t(i)$ of the frame that has been examined can be used to examine the channel feature vector $\tau_t(2)$ or $\tau_t(i+1)$.

For example, when the wireless base station believes that the information of the first frame being detected comes from a legitimate terminal, the wireless base station should use the stored similar feature vector to continue to examine the second frame.

Step 2.2.3, use the method in step 2.2.2 to examine the channel feature vectors of multiple frames, and to determine whether the wireless terminal is a legitimate terminal.

Preferably, the SVM parameter combination optimization method based on improved differential evolution is used to identify the channel feature vectors of the initial frame, and to examine the channel feature vectors of multiple frames.

Figure 6:
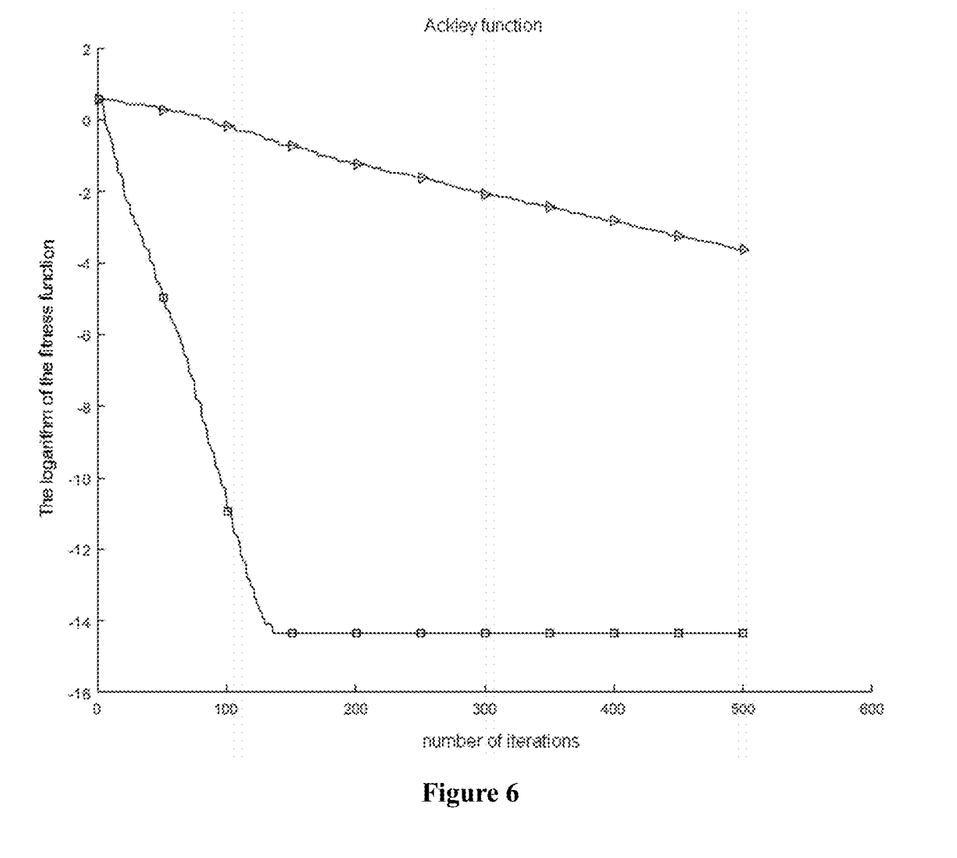
FIG. 6 is a schematic diagram of the computing effect of the differential evolution method with an adaptive improvement of the control parameters in an embodiment of the SVM-based secure access method for wireless terminals of the present invention.
Figure 7:
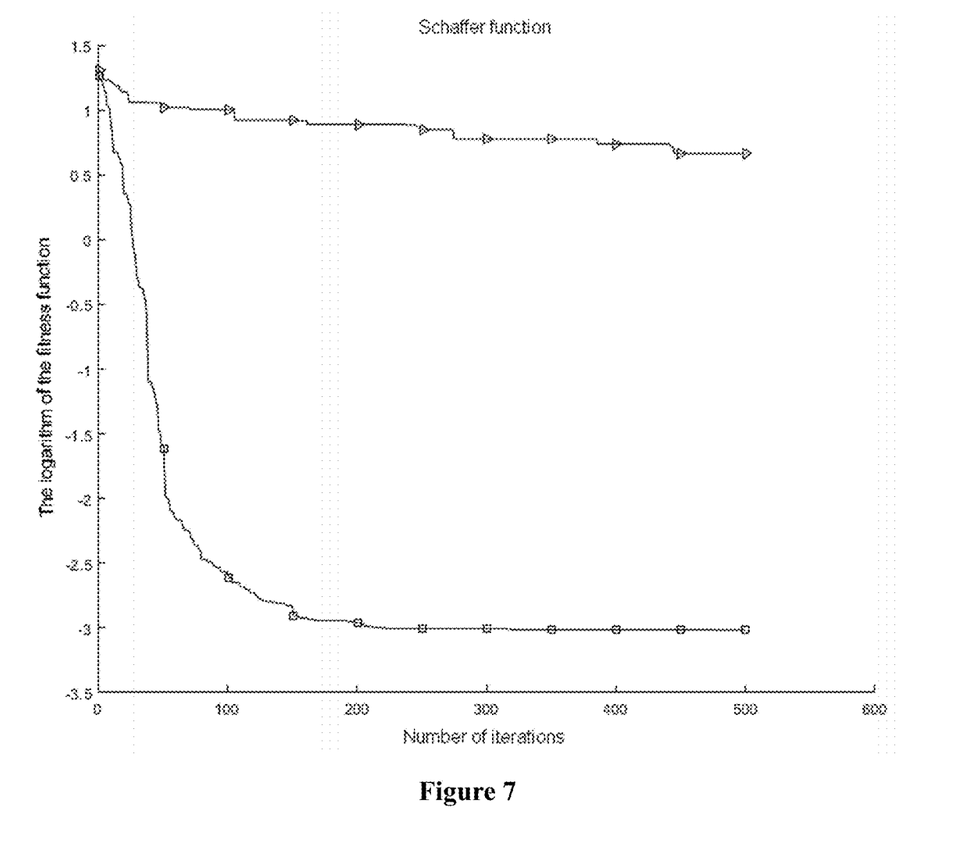
FIG. 7 is a schematic diagram of the computing effect of the differential evolution method with an adaptive improvement of the control parameters in another embodiment of the SVM-based wireless terminal secure access method of the present invention.

FIG. 6 is a schematic diagram of the computing effect of the differential evolution method with an adaptive improvement of the control parameters in an embodiment of the SVM-based secure access method for wireless terminals of the present invention. FIG. 7 is a schematic diagram of the computing effect of the differential evolution method with an adaptive improvement of the control parameters in another embodiment of the SVM-based wireless terminal secure access method of the present invention. As shown in FIG. 6-7, the logarithmic value of the fitness function in the improved SVM decreases significantly as the number of iterations increases. Regardless of whether the Ackley function or the Schaffer function is used in the algorithm, when the number of iterations is between 0 and 150, as the number of iterations increases, the logarithm of the fitness function value will decrease significantly. When the number of iterations exceeds 150 times, the logarithm of the fitness function value will be roughly stable within a certain numerical range. For example, when using the Ackley function, the logarithmic value will stabilize at about −14 dB, and when using the Schaffer function, the logarithmic value will stabilize at about −3 dB. Compared with the standard SVM algorithm, the fitness function value converges faster.

Table 1 is the optimal solution obtained based on different differential optimization algorithms and different kernels in the present invention. It can be seen from the experimental data in Table 1 that compared with the standard differential evolution algorithm (DE) model, the differential evolution method with an adaptive improvement of the control parameters of the present invention has higher classification accuracy, meaning more accurate classification results.

| Function | Al-gorithms | Optimal Solution | Average Optimal Fitness Value | Standard Deviation |
|---|---|---|---|---|
| Griewank | DE | 4.521E−09 | 5.942E−09 | 9.201E−10 |
|  | DE method of the present invention | 0 | 0 | 0 |
| Ackley | DE | 2.051E−04 | 2.433E−04 | 1.705E−05 |
|  | DE method of the present invention | 4.2361E−15 | 4.441E−15 | 2.492E−30 |
| Rastrigrin | DE | 2.346E+01 | 3.896E+01 | 4.079E+00 |
|  | DE method of the present invention | 0 | 0 | 0 |
| Schaffer | DE | 4.722E+00 | 5.254E+00 | 4.068E−01 |
|  | DE method of the present invention | 1.211E−04 | 1.024E−01 | 1.199E−01 |
| Sphere | DE | 8.85E−08 | 1.403E−07 | 3.33E−08 |
|  | DE method of the present invention | 1.14E−117 | 2.45E−111 | 4.97E−111 |

Table 2 shows the classification accuracies of different SVMs in the present invention. It can be seen from the experimental data in Table 2 that compared with the standard SVM, the SVM parameter combination optimization method based on improved differential evolution has a higher accuracy.

| Computing Models | Penalty Parameter (C) | RBF kernel ($\delta$) | Accuracy (%) |
|---|---|---|---|
| Standard SVM | 31 | 2.653 | 92.32 |
| SVM of the present invention | 43 | 0.362 | 98.96 |

The second aspect of the present invention further includes an SVM parameter combination optimization method based on improved differential evolution. The optimization method can be realized by adopting the SVM parameter combination optimization method based on improved differential evolution described in the SVM-based secure access method for wireless terminals in the first aspect of the present invention. The optimization method can not only be applied to the secure access method of a wireless terminal in the present invention, but also can be applied to various applications implemented using the SVM algorithm.

The third aspect of the present invention includes a differential evolution method with an adaptive improvement of the control parameters. The differential evolution method adopts the differential evolution method with an adaptive improvement of the control parameters described in the SVM-based secure access method for wireless terminals in the first aspect of the present invention. In addition to be able to be applied to the secure access method of a wireless terminal in the present invention, the method can also be applied to applications implemented using various differential evolution algorithms.

Beneficial effects of the present invention include:

1. The invention can not only be applied to the wireless power base station in the electric power private network to determine the legitimacy of the wireless power terminals, but can also be used in various general mobile communication services with wide application range and complete coverage.

2. The invention stays away from the traditional secret key authentication technology, effectively avoiding the complicated process of decrypting the authentication model through the upper layer protocol, thus it saves system resources, and resolves the safe access problem. At the same time, by directly performing secure access authentication at the physical layer, the authentication model is more difficult to decipher, and the security of accessing the wireless terminals is enhanced. In addition, the secure access authentication based on the physical layer feature does not need to rely on upper-layer communication protocols and does not require encryption and decryption; this saves a lot of communication resources and greatly reduces communication delay.

3. Based on the improved support vector machine algorithm, the present invention can adjust the obviousness of changes in the fitness function value on the optimization principle of minimizing the misjudgment rate of samples. In addition, the improved support vector machine algorithm avoids the process of inverting the sample matrix resulted by the adaptive beamforming algorithm to offset signal interference, thus reducing the complexity of the authentication model algorithm and improving the accuracy and stability of the algorithm.

4. The adaptive improvement method of the differential evolution algorithm based on the arc function proposed in the present invention can balance the global search ability and the local search ability, thus improving the search efficiency of the traditional differential evolution algorithm. In addition, through the member selection operation to protect the good and to eliminate the bad, the method can also improve the search efficiency while ensuring that good members are uneliminated and the group diversity is unlost. The improved differential evolution algorithm in the present invention can also prevent the algorithm from being trapped with a local optimum by randomly replacing candidate solutions.

Although the description of exemplary embodiments is comprehensively detailed and described with references to the accompanying drawings in the embodiments of the present invention, those of ordinary skill in the art should acknowledge that the same is by way of illustration and example only to help better understand the core ideas of the present invention and is not to be taken by way of limitation. On the contrary, any changes or modifications made based on the spirit of the present invention should fall within the scope of protection of the present invention.

The invention claimed is:

1. An SVM (Support Vector Machines)-based secure access method for wireless terminals, comprising:
   establishing a wireless network model based on the communication scenarios of a wireless power terminal and a wireless power base station;
   establish the channel feature vectors based on the wireless network model and frames received by the wireless power base station;
   extracting feature values of the feature vectors are one or more than one factors among the signal arrival moment, the signal angle, and the large-scale fading factor of the signal;
   using a pre-trained SVM model to examine the channel feature vectors of the frames, determining whether the frames are legitimate signals, where the pre-trained SVM model is obtained from the extracted feature values of the signal based on the physical layer feature of a 5G communication system;
   determining whether the wireless power terminal with at least one frame sent is a legitimate terminal based on whether at least one of the frames sent is a legitimate signal;
   wherein the determination is achieved according to an SVM parameter combination optimization method based on improved differential evolution;
   moreover, a method for obtaining each trial candidate composed of mutated candidate solutions in the improved differential evolution into perform two differential evolution mutations by combining a base of the random mutation operation and a base of the mutation operation for a best solution in current population, resulting in vj (g)=y−xr$_1$(g)+(1−y)−xbest(g)+F−[xr$_2$(g)−xr$_3$(g)]+F [x$_{14}$(g)−x$_1$s(g)], where g is the current iteration number, i=1,2 - - - N, vt (g) is the trial candidate, y=, x$_r$1(g) is a random candidate of the current population, x$_b$est(g) is the best solution of the current population, best, r1, r2, r3, r4, r5 are candidates of the current population different from each other;
   and authenticating the determined legitimate terminal to access the wireless power base station.

2. The SVM-based secure access method for wireless terminals according to claim 1, wherein,
   the channel feature vectors established based on the frames received by the wireless base station include feature values of the distinguishable physical layer feature related to the wireless network model which are extracted from the frames.

3. The SVM-based secure access method for wireless terminals according to claim 2, wherein,
   the channel feature vectors include N feature values of the distinguishable physical layer feature.

4. The SVM-based secure access method for wireless terminals according to claim 1, wherein,
   the method for pre-training the SVM is:
   establishing a wireless network model based on the communication scenario of the wireless terminals and the wireless base station;
   receiving frames sent from the wireless terminals through the wireless base station, and extract the distinguishable physical layer feature related to the wireless network model from the frames as feature values;
   determining the initial decision labels for the frames; the initial decision labels are used to set the wireless terminals, from which the frames are sent, as legitimate terminals or illegitimate terminals;
   generating a sample set for training and testing based on the feature vectors established from the feature values of the frames and the initial decision labels, and use the training sample set to train the SVM model;
   using the trained SVM to classify the training sample set.

5. The SVM-based secure access method for wireless terminals according to claim 4, further comprising,
   adopting the SVM parameter combination optimization method based on improved differential evolution to generate the SVM and obtain the optimized SVM.

6. The SVM-based secure access method for wireless terminals according to claim 4, further comprising,
   updating the feature values extracted from the frames when using the trained SVM to classify the training sample set.

7. The SVM-based secure access method for wireless terminals according to claim 1, wherein,
   the method for examining the channel feature vectors of the frames is:
   according to the SVM parameter combination optimization method based on improved differential evolution, identifying the channel feature vectors of the initial frame and make preliminary determination on whether the wireless terminal that sends the initial frame is a legitimate terminal;
   obtaining the similarity between the channel feature vectors of the initial frame and that of the next frame in order to examine the next frame following the initial frame;
   examining the channel feature vectors of multiple frames of the frames, and determining whether the wireless terminal is a legitimate terminal.

8. The SVM-based secure access method for wireless terminals according to claim 7, further comprising,
   setting the channel feature parameters $\tau_A = [\tau_{A,0}, \tau_{A,1} \ldots, \tau_{A,N}]$ according to the physical layer features of the wireless base station, where A is a legitimate terminal, and N is the number of sampled samples of the frames;
   using the channel feature parameters to identify the channel feature vector $\tau_r(1)$ of the initial frame received by the wireless base station;
   when the initial frame is identified to be a legitimate signal, that is, when $\tau_r(1)=\tau_A$, it is determined that the wireless terminal sending the initial frame is a legitimate terminal; when the initial frame is identified as an interference signal, that is, when $\tau_r(1) \neq \tau_A$, it is determined that the wireless terminal sending the initial frame is an illegitimate terminal.

9. The SVM-based secure access method for wireless terminals according to claim 7, further comprising:
using the channel feature vector $\tau_f(1)$ or $\tau_f(i)$ of the frame that has been examined to examine the channel feature vector $\tau_f(2)$ or $\tau_f(i+1)$, where i=1, 2 . . . N.

10. The SVM-based secure access method for wireless terminals according to claim 5, wherein, the SVM parameter combination optimization method based on improved differential evolution includes the following steps:
setting the value ranges for the penalty parameter and the kernel, and randomly generating initial populations based on the value ranges;
training and testing the sample data based on the initial population to obtain sample classification results;
based on the sample classification results, calculating the number of classified samples and the number of misclassified samples, and using the number of classified samples and number of misclassified samples to calculate the misclassification rate;
defining the misclassification rate to be the fitness function of the population, and the population of the next generation is obtained by the differential evolution method with an adaptive improvement of the control parameters based on the fitness function of the population.

11. The SVM-based secure access method for wireless terminals according to claim 10, wherein, the differential evolution method with an adaptive improvement of the control parameters includes the following steps:
initializing the population and use the arc function to set the mutation operator and the crossover operator;
based on the mutation operator and crossover operator set, performing mutation operation on the initial population in turn to find the trial candidate;
performing the crossover operation and the selection operation on the trial candidate generated by the mutation operation, as to produce the population of the next generation;
determining whether the population of the next generation satisfies the termination criterion; if the criterion is met, output the optimal solution; if not, return to performing the mutation operation until the criterion is satisfied.

12. The SVM-based secure access method for wireless terminals according to claim 11, further comprising,
setting the mutation operator as $$F = 2 \cdot \sqrt{1 - \left(\frac{g}{G}\right)^2},$$

and the crossover operator $$R = 1 - \sqrt{1 - \left(\frac{g}{G}\right)^2},$$

where g is the current iteration number, G is the number of iterations to terminate, $F \in [0,2]$, $CR \in [0,1]$.

13. The SVM-based secure access method for wireless terminals according to claim 11, further comprising,
according to the trial candidate to generate a new solution, performing a crossover operation;
according to the new solution, calculating fitness function value of the population and merging the fitness function value with each candidate of the current population to produce the temporary population of the next generation;
calculating the variance of fitness of the population and comparing it with the variance threshold to determine whether or not to randomly generate candidate solutions to replace the temporary population of the next generation based on the new-born candidates; and producing the population of the next generation when it is determined to do so.

14. The SVM-based secure access method for wireless terminals according to claim 13, further comprising:
combining all candidates in the new solution and in the initial population, and sorting all candidates according to their fitness function values, retaining the top 10% of the candidates, and removing the bottom 10% of the candidates; each of the candidates in the middle 80% is selected according to the greedy algorithm to produce the temporary population of the next generation.

15. The SVM-based secure access method for wireless terminals according to claim 13, wherein:
the variance of the fitness function value with each candidate of the population is $\delta^2 = \Sigma_{i=1}^{N} |f_i(g) - f_{average}(g)|^2$, where N is the number of candidates in the population, $f_i(g)$ is the fitness function value of the i-th candidate, and $f_{average}(g)$ is the average fitness function value of the current population.

16. The SVM-based secure access method for wireless terminals according to claim 13, further comprising:
presetting the variance threshold $\tau$, and determining subsequent steps based on the current iteration number g and variance $\delta^2$; when the iteration number is half of the number of iterations to terminate, and the variances of M consecutive iterations $\delta^2 \le \tau$, determine that k new-born candidates should be randomly generated, and the temporary population of the next generation is replaced based on the k new-born candidates to produce the population of the next generation.

17. An SVM parameter combination optimization method based on improved differential evolution wherein:
the method is achieved by adopting the SVM parameter combination optimization method based on improved differential evolution described in the SVM-based secure access method for wireless terminals according to claim 10.

18. A differential evolution method with an adaptive improvement of the control parameters wherein:
the method is achieved by adopting the differential evolution method with an adaptive improvement of the control parameters described in the SVM-based secure access method for wireless terminals according to claim 11.

* * * * *